(12) United States Patent
Jang

(10) Patent No.: US 8,156,365 B2
(45) Date of Patent: Apr. 10, 2012

(54) DATA RECEPTION APPARATUS

(75) Inventor: Byung-Tak Jang, Seongnam-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 507 days.

(21) Appl. No.: 12/411,349

(22) Filed: Mar. 25, 2009

(65) Prior Publication Data

US 2009/0252268 A1    Oct. 8, 2009

(30) Foreign Application Priority Data

Apr. 2, 2008   (KR) ........................ 10-2008-0030712
Apr. 2, 2008   (KR) ........................ 10-2008-0030714

(51) Int. Cl.
*G06F 1/00*   (2006.01)
(52) U.S. Cl. ........................ 713/500; 713/600; 327/161
(58) Field of Classification Search .......... 713/500–600; 327/161
See application file for complete search history.

(56) References Cited

U.S. PATENT DOCUMENTS

2003/0086303 A1*   5/2003   Jeong ....................... 365/189.05
2005/0220196 A1   10/2005   Okada
2010/0090737 A1*   4/2010   Watanabe et al. ............. 327/161

FOREIGN PATENT DOCUMENTS

JP   2005-293353        10/2005
KR   100208981 B1        4/1999
KR   100653158 B1       11/2006

* cited by examiner

*Primary Examiner* — Brian Misiura
*Assistant Examiner* — Kim Huynh
(74) *Attorney, Agent, or Firm* — Sherr & Vaughn, PLLC

(57) ABSTRACT

A data reception apparatus is disclosed. The data reception apparatus includes a strobe extractor for receiving a transmission signal and extracting a strobe signal from the transmission signal, the transmission signal including the strobe signal inserted between data signals and a clock signal following the strobe signal, the strobe signal having a different magnitude from a magnitude of a data signal, and the clock signal having an equal magnitude to the magnitude of the data signal, a clock recoverer for recovering the clock signal from the transmission signal, using the extracted strobe signal, and a sampler for sampling the data signals included in the transmission signal in response to the recovered clock signal. The probability of generating a timing skew error in the time interval between a clock signal and a data signal is minimized. Even though the level of a common component might change, the clock signal can be recovered accurately and the size of the clock recovery circuit can be reduced. Further, the data reception apparatus is suitable for transmitting/receiving data at a high transmission rate, and is robust against noise generated during transmission of the data signal and the clock signal, or against noise generated along a common path.

20 Claims, 12 Drawing Sheets

Figure 1:
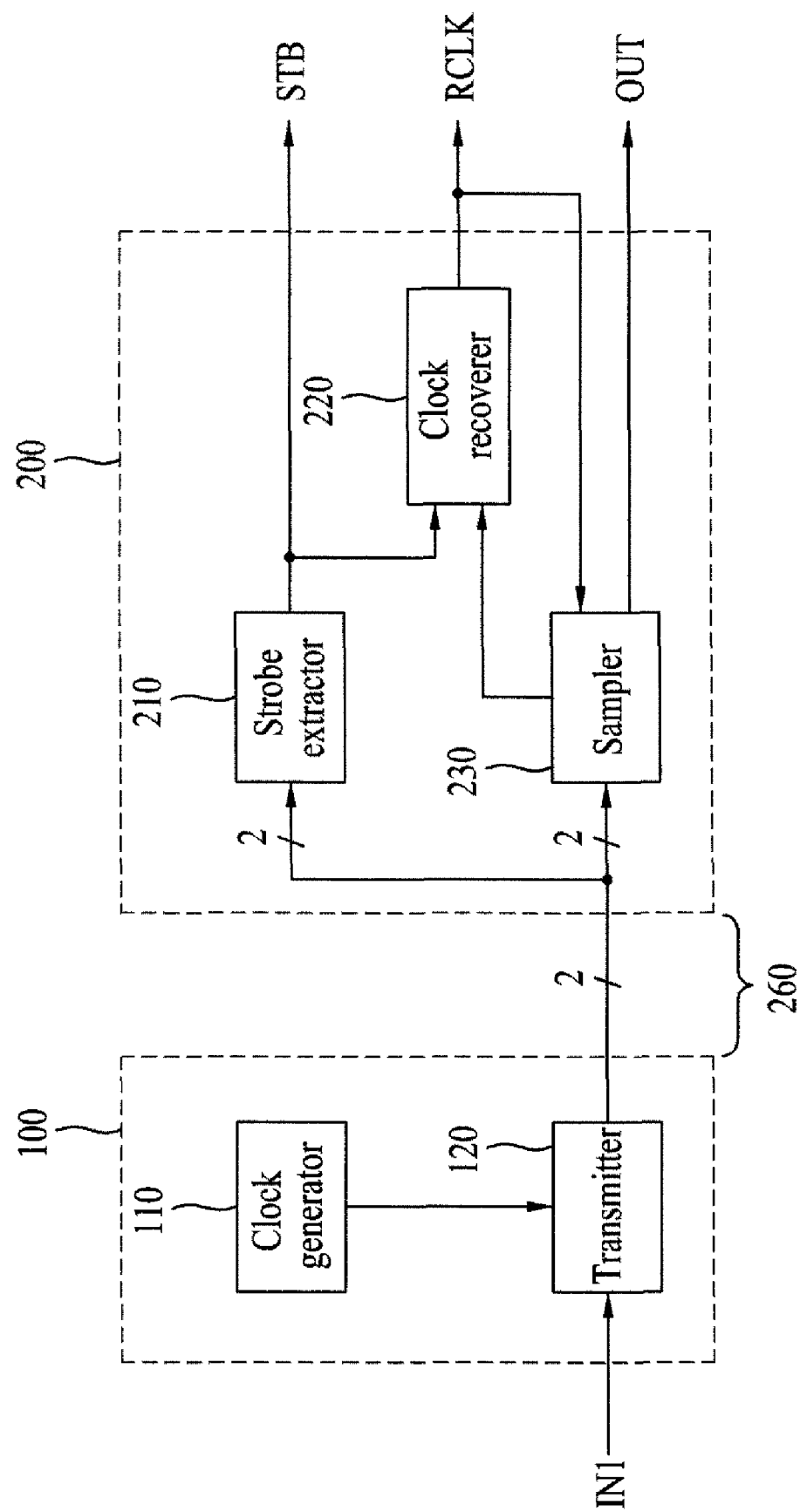

FIG. 10
(a)
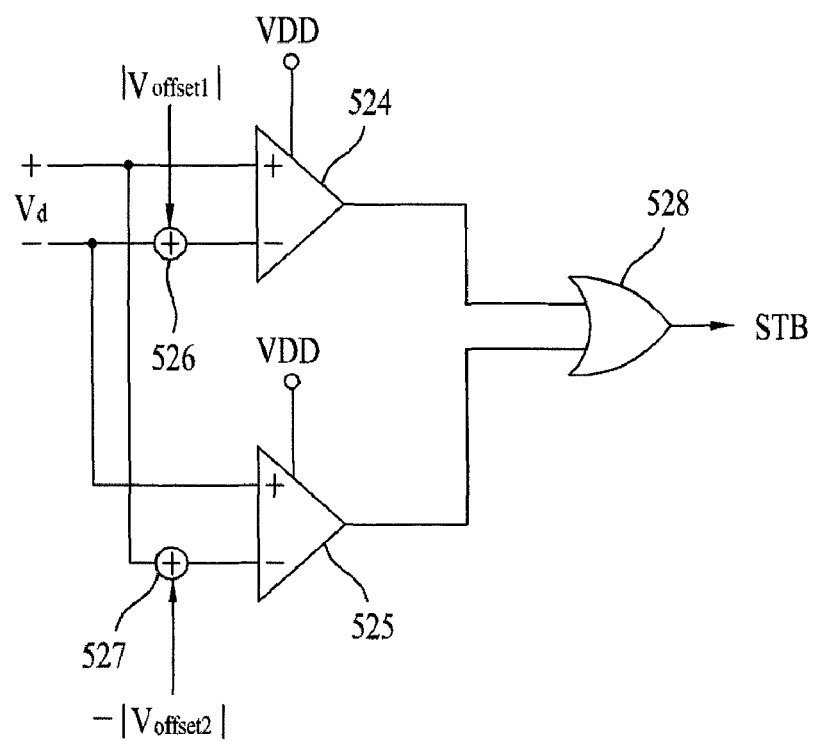
(b)
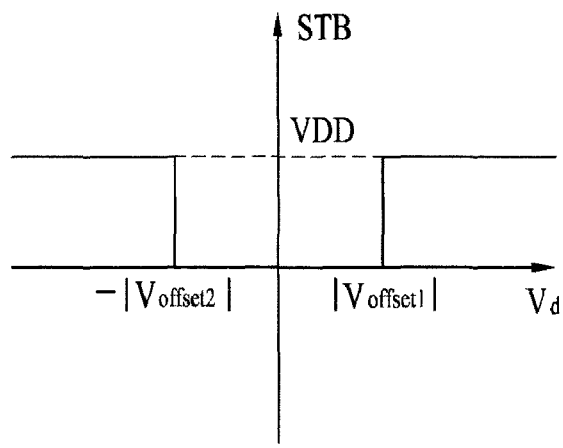

DATA RECEPTION APPARATUS

The present application claims priority under 35 U.S.C. 119 to Korean Patent Application No. 10-2008-0030712 (filed on Apr. 2, 2008) and Korean Patent Application No. 10-2008-0030714 (filed on Apr. 2, 2008), which are hereby incorporated by reference in its entirety.

BACKGROUND

As the resolutions of displays such as a TV or a monitor increase, a larger amount of data needs to be transmitted. Therefore, when data is transmitted at a high data rate, the most Electromagnetic Interference (EMI) or Radio Frequency Interference (RFI) occurs in a data transmission line between a timing controller and a source driver, which is a column driving integration circuit. To reduce the interference, a small signal differential transmission scheme may be used, such as Reduced Swing Differential Signaling (RSDS) or mini-Low Voltage Differential Signaling (mini-LVDS).

Along with an increase in data rate, RSDS and mini-LVDS suffer from degradation of signal quality because a plurality of source drivers share a data line and a clock line. Impedance mismatch occurs at points where the lines are branched to the source drivers. In this context, Point-to-Point Differential Signaling (PPDS) has recently been proposed overseas, in which a timing controller is connected to a source driver in a one-to-one correspondence. Korea has also developed such a scheme.

Although for data, a timing controller is connected to source drivers in a one-to-one correspondence, a plurality of source drivers share a clock signal in PPDS. As a result, PPDS increases the timing skew error between the clock signal and the data signal during high-speed data transmission, thereby making it difficult to increase a transmission rate.

Meanwhile, the scheme developed in Korea transmits a clock signal and a data or control signal serially on one transmission line. Since the clock signal and the data signal are transmitted with the same time delay, the timing skew error between the clock signal and the data signal during transmission can be reduced. However, this scheme also has a shortcoming. That is, in order to detect a clock signal from a received signal, a source driver compares the level of the received signal with each level of a reference signal. If the level of a common component between a clock signal and a data signal received at the source driver changes, the embedded clock signal cannot be detected accurately.

SUMMARY

The present invention relates to a new data interfacing scheme applicable to a timing controller and a source driver that area designed for Chip on Glass (COG), Chip on Film (COF), or Tape Carrier Package (TCP), and more particularly, to a data reception apparatus.

Embodiments relate to a data reception apparatus for reliably recovering a clock signal using a strobe signal extracted from a transmission signal having the strobe signal embedded between a clock signal and a data signal.

Embodiments relate to a data reception apparatus for efficiently extracting a strobe signal from a transmission signal having the strobe signal embedded between a clock signal and a data signal, recovering the clock signal, and sampling data.

Embodiments relate to a data reception apparatus which may include a strobe extractor configured to receive a transmission signal and extract a strobe signal from the transmission signal, the transmission signal including the strobe signal inserted between data signals and a clock signal following the strobe signal, the strobe signal having a different magnitude from a magnitude of a data signal, and the clock signal having a magnitude equal to the magnitude of the data signal. The data reception apparatus may further include a clock recoverer configured to recover the clock signal from the transmission signal, using the extracted strobe signal, and a sampler configured to sample the data signals included in the transmission signal in response to the recovered clock signal.

Embodiments relate to a data reception apparatus which may include a strobe extractor configured to receive a transmission signal and extract a strobe signal from the transmission signal according to a result of comparing differential components of the transmission signal with first and second offset levels, the transmission signal including the strobe signal inserted between data signals and a clock signal following the strobe signal, the strobe signal having a different magnitude from a magnitude of a data signal, and the clock signal having an equal magnitude to the magnitude of the data signal. The data reception apparatus may further include a clock recoverer configured to recover the clock signal from the transmission signal, using the extracted strobe signal, and a sampler configured to sample the data signals included in the transmission signal in response to the recovered clock signal.

Embodiments relate to a data reception apparatus which may include a strobe extractor configured to receive a transmission signal and extract a strobe signal from the transmission signal according to a result of comparing a difference between differential components of the transmission signal with a threshold voltage, the transmission signal including the strobe signal inserted between data signals and a clock signal following the strobe signal, the strobe signal having a positive level and a negative level transmitted on an alternating P-channel and N-channel and having a different magnitude from a magnitude of a data signal, and the clock signal having an equal magnitude to the magnitude of the data signal. The data reception apparatus may further include a clock recoverer configured to recover the clock signal from the transmission signal, using the extracted strobe signal, and a sampler configured to sample the data signals included in the transmission signal in response to the recovered clock signal.

DRAWINGS

Example FIG. 1 is a block diagram of a data transmission apparatus and a data reception apparatus according to embodiments.

Figure 2:
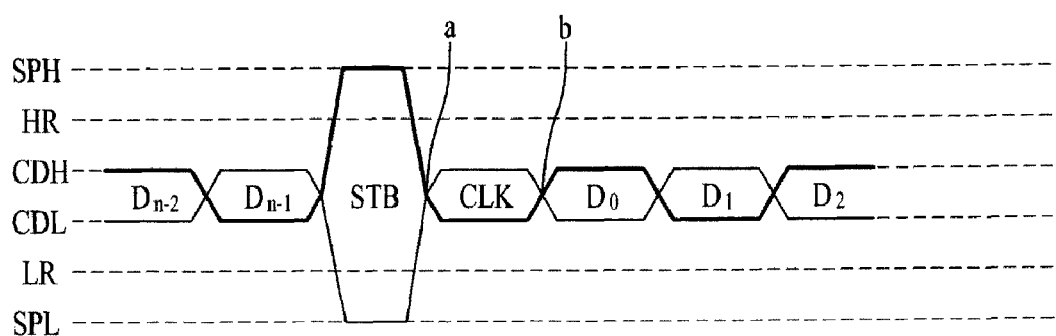
Figure 3:
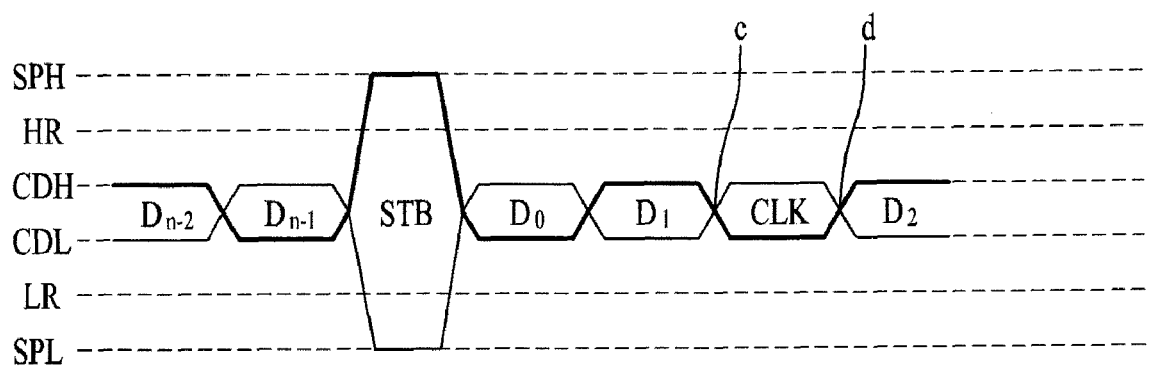
Figure 4:
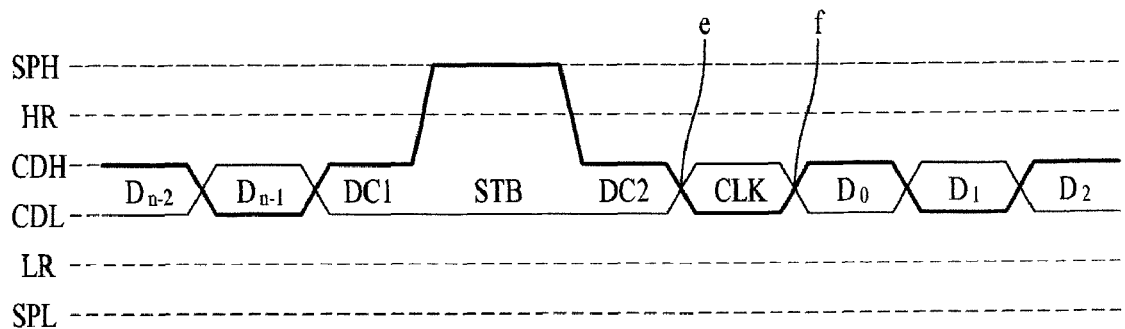

Example FIGS. 2, 3 and 4 illustrate exemplary waveforms of a transmission signal generated from a transmitter according to embodiments.

Figure 5:
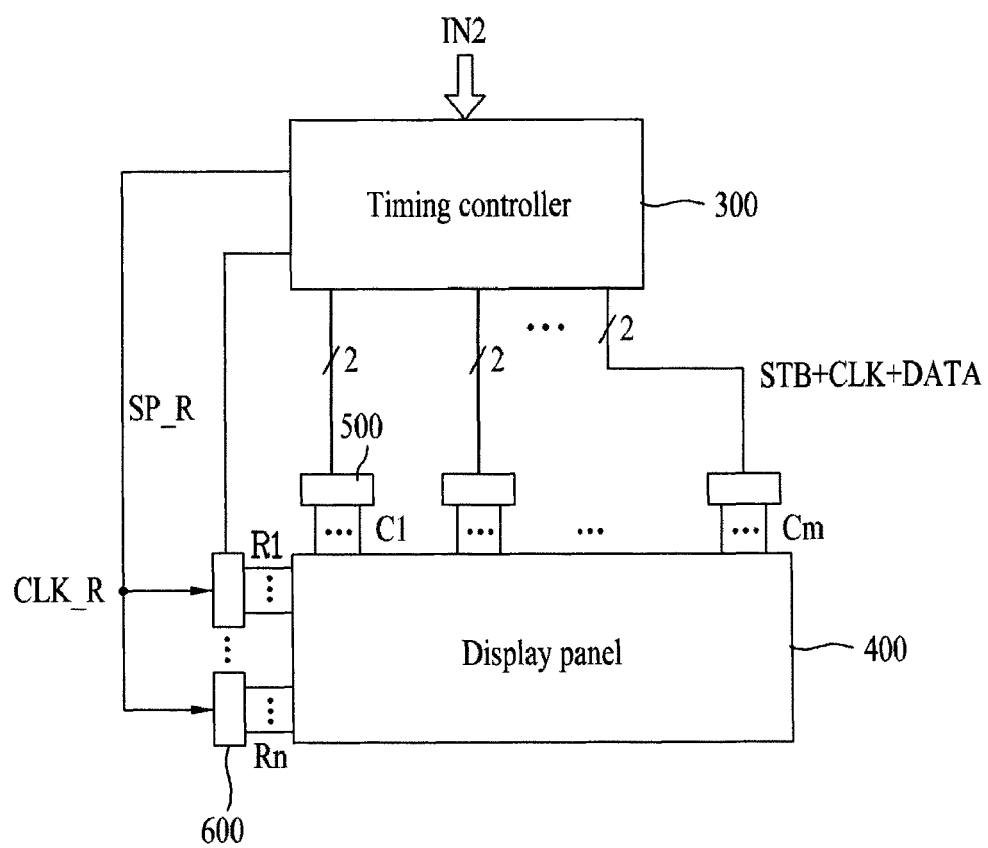

Example FIG. 5 illustrates the configuration of a display according to embodiments.

Figure 6:
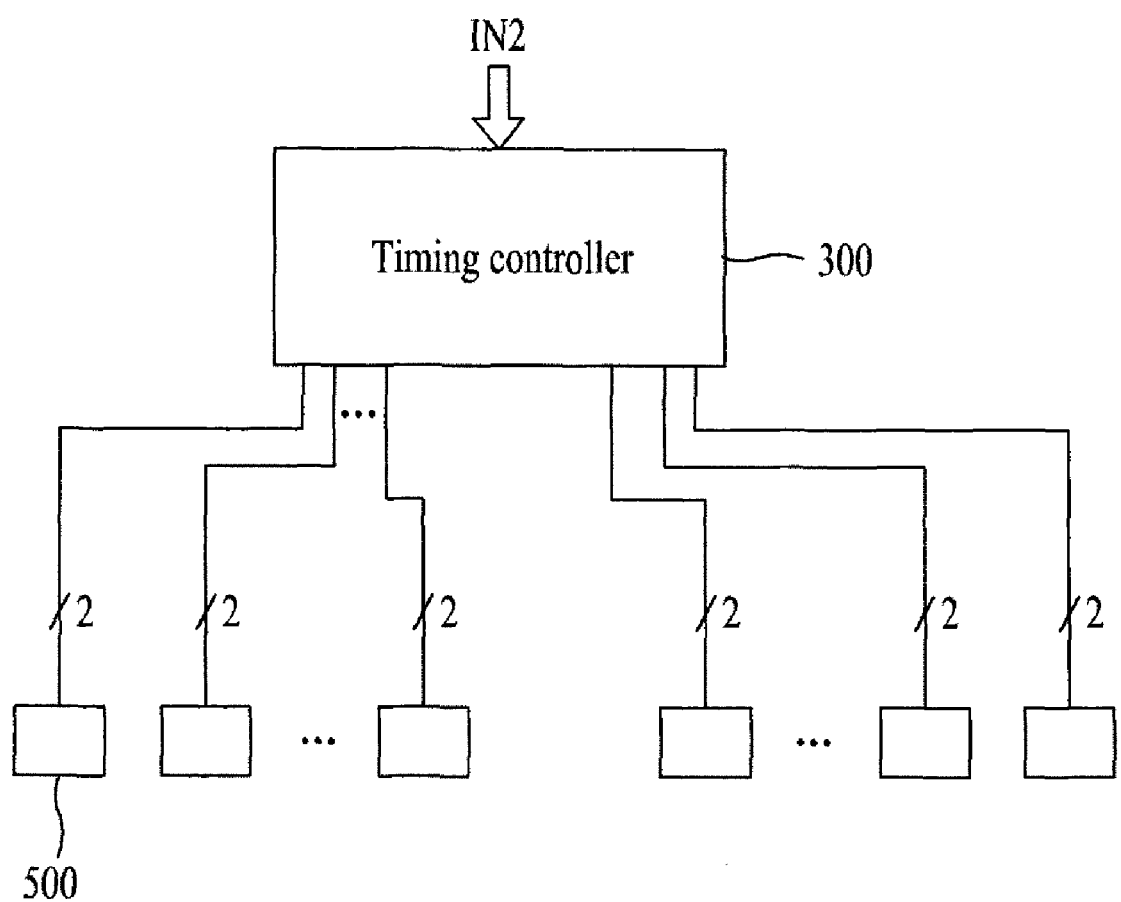

Example FIG. 6 illustrates a transmission signal delivery structure between a timing controller and column driving circuits to help understanding of the display illustrated in example FIG. 5.

Figure 7:
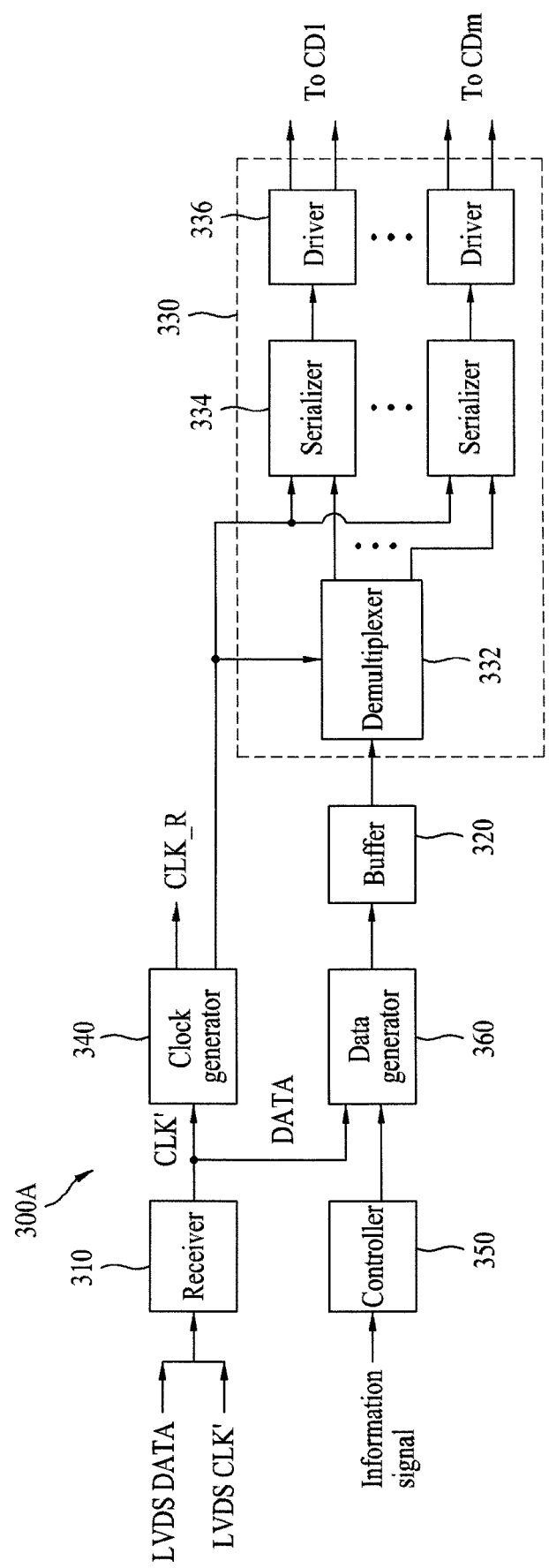

Example FIG. 7 is a schematic block diagram of the timing controller illustrated in example FIGS. 5 and 6 according to embodiments.

Figure 8:
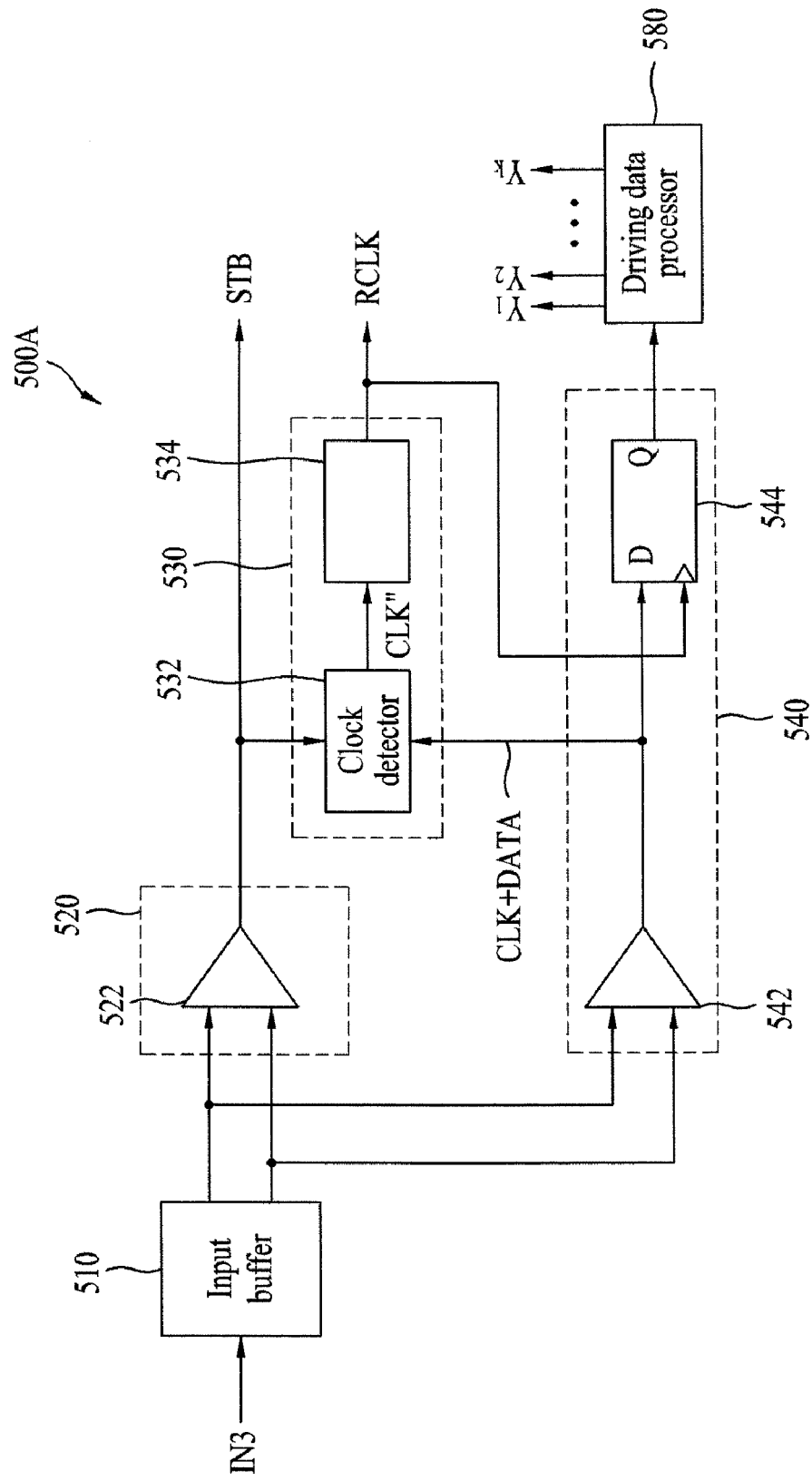

Example FIG. 8 is a block diagram of a column driving circuit illustrated in example FIGS. 5 and 6 according to embodiments.

Figure 9:
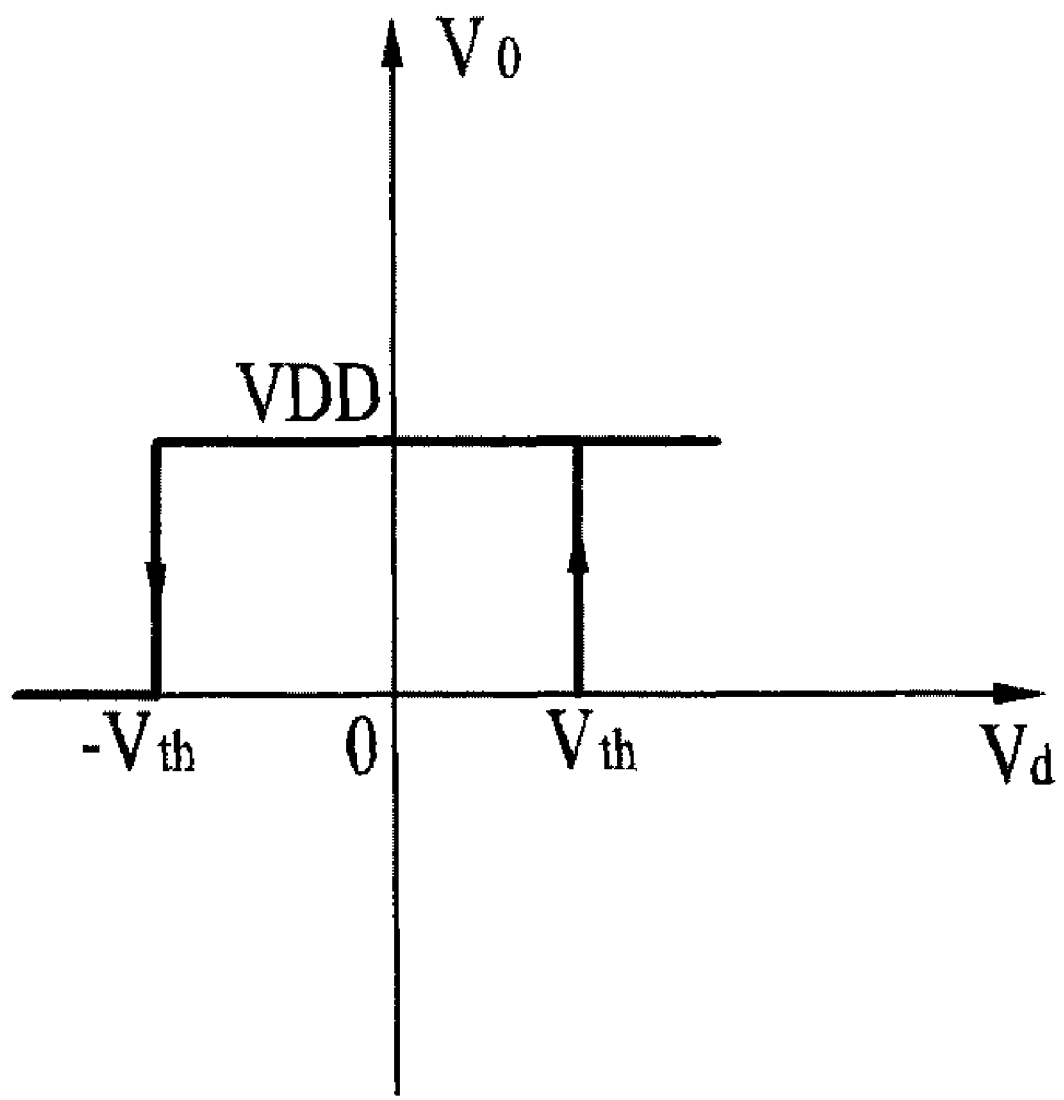

Example FIG. 9 illustrates a waveform to describe a hysteresis comparator illustrated in example FIG. 8.

Example FIGS. 10A and 10B are a block diagram and an operational waveform diagram of a strobe extractor illustrated in example FIG. 8 according to embodiments.

Figure 11:
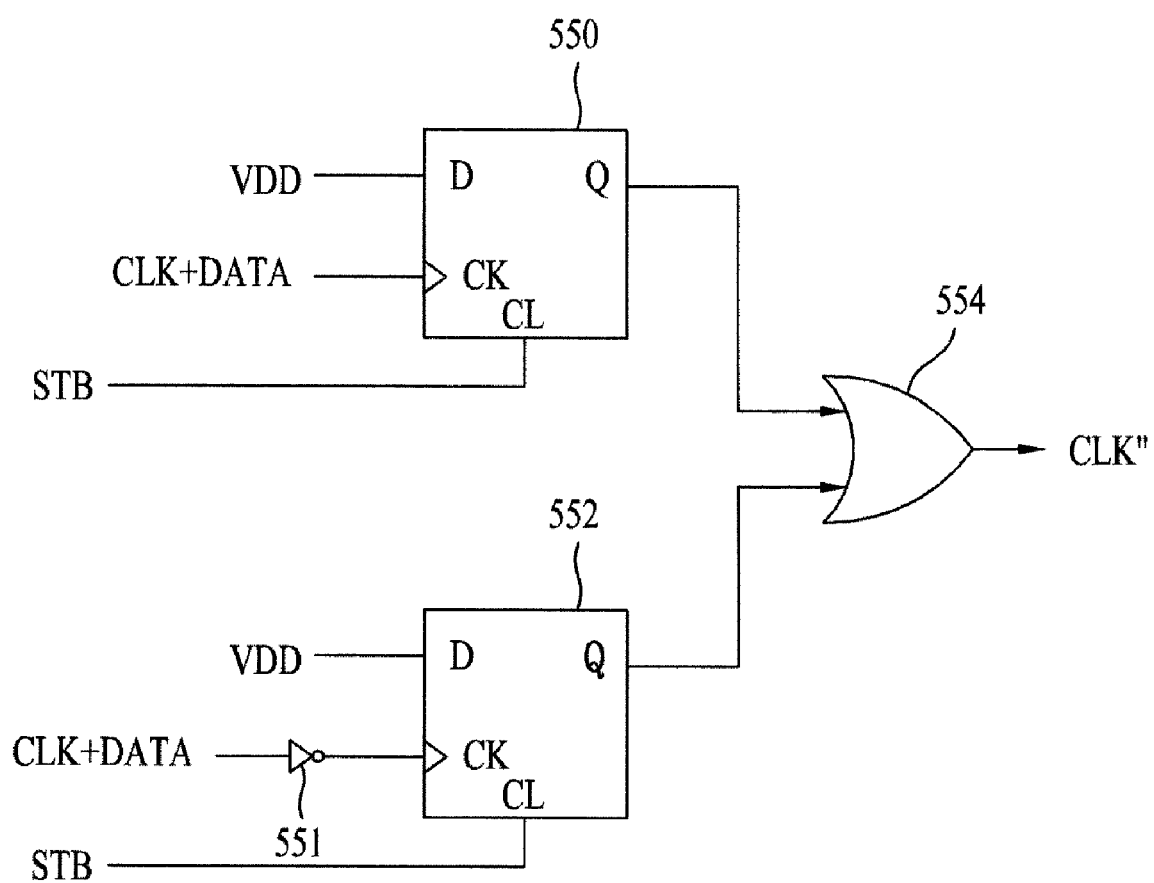

Example FIG. 11 is a block diagram of a clock detector illustrated in example FIG. 8 according to embodiments.

Figure 12:
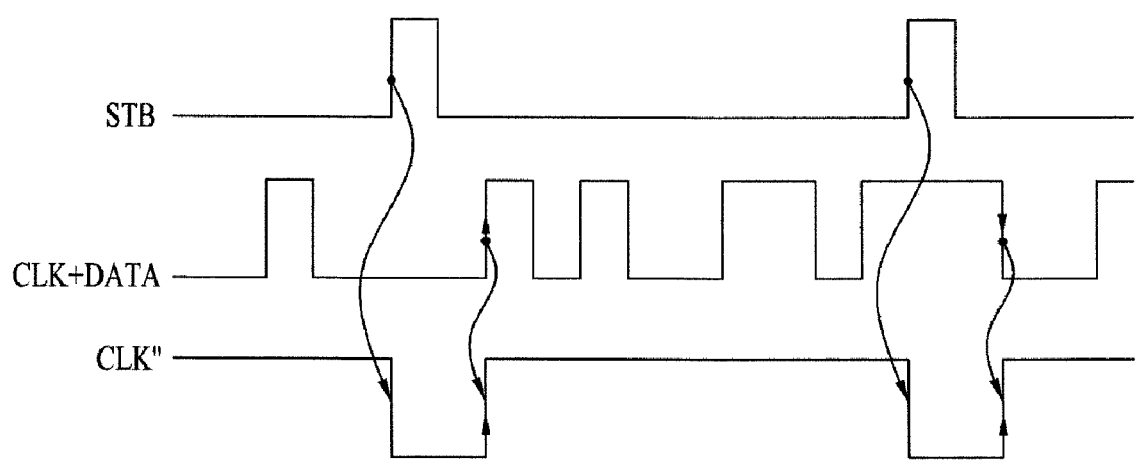

Example FIG. 12 illustrates waveforms of signals input to and output from each component illustrated in example FIG. 11.

Figure 13:
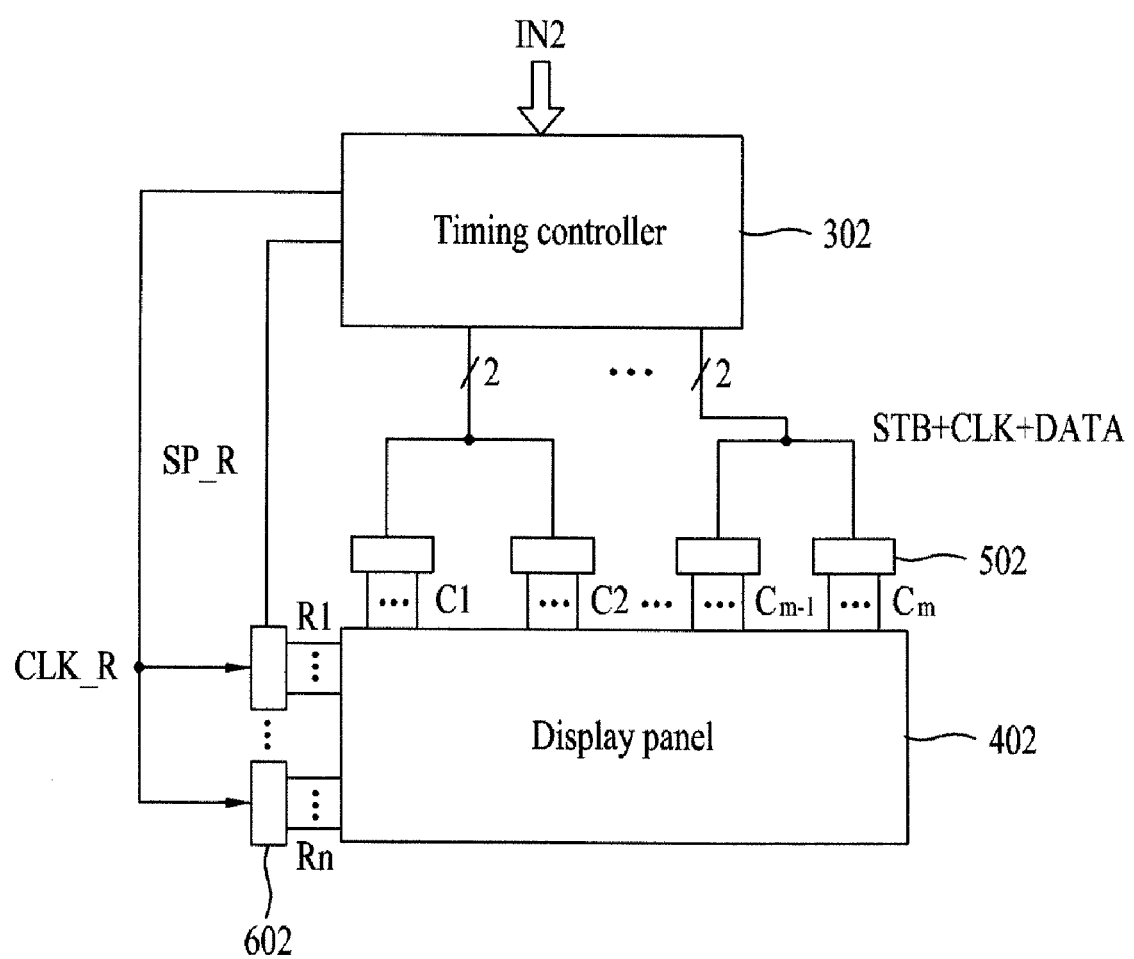

Example FIG. 13 is a block diagram of a display according to embodiments.

Figure 14:
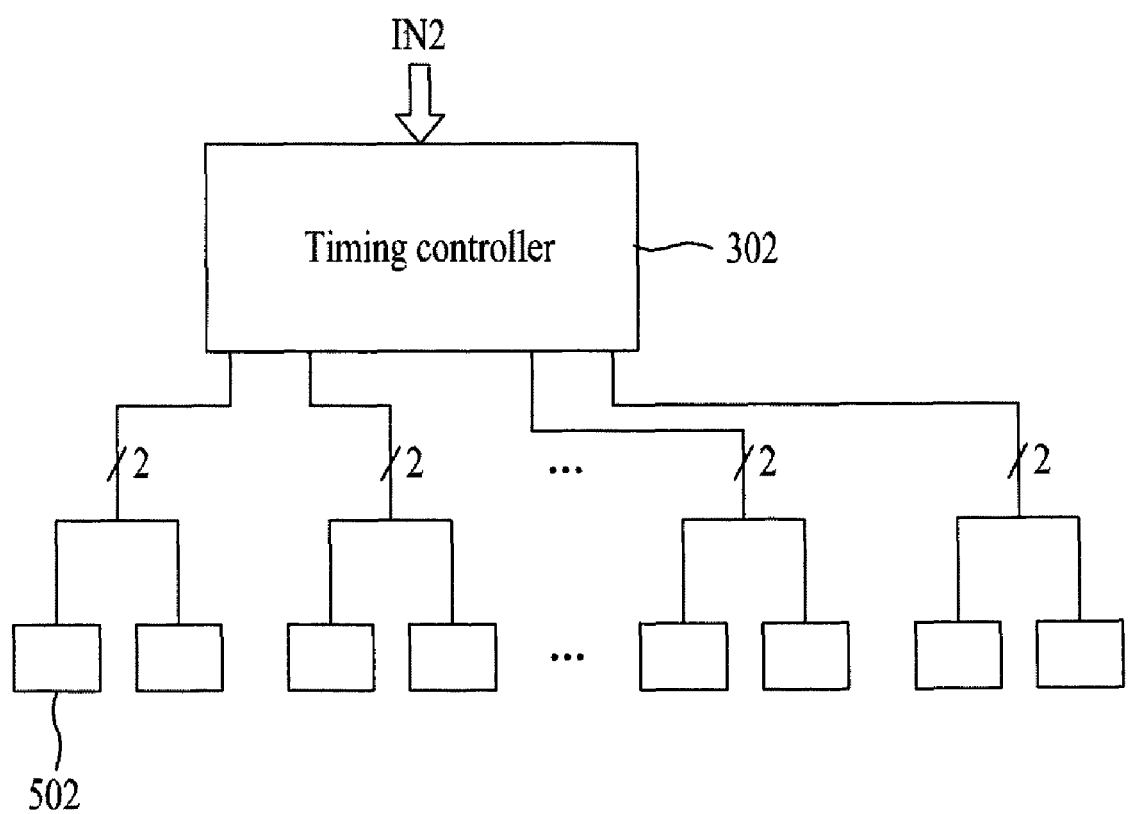

Example FIG. 14 illustrates only a transmission signal delivery structure between a timing controller and column driving circuits to help understanding of the display illustrated in example FIG. 13.

DESCRIPTION

The configurations and operations of a data transmission apparatus and a data reception apparatus according to embodiments will be described below. Example FIG. 1 is a block diagram of a data transmission apparatus and a data reception apparatus according to embodiments. In example FIG. 1, a data transmission apparatus 100 includes a clock generator 110 and a transmitter 120. A data reception apparatus 200 includes a strobe extractor 210, a clock recoverer 220, and a sampler 230.

Referring to example FIG. 1, the clock generator 110 generates a clock signal, and outputs the generated clock signal to the transmitter 120. The transmitter 120 generates a transmission signal using the clock signal received from the clock generator 110 and data received through an input port IN1 and transmits the transmission signal to the data reception apparatus 200 through channels 260. According to embodiments, the transmitter 120 generates the transmission signal such that a strobe signal STB is embedded between data signals, followed by a clock signal. The strobe signal STB is different from a data signal in magnitude (or level) and the data signal is equal to the clock signal in magnitude (or level). A plurality of clock signals may be embedded between strobe signals, STB.

The strobe signal STB is meant to indicate the start and end of information sequentially input in embodiments. The strobe signal STB indicates to the data reception apparatus the end of one data set and the start of another data set. It does not include the information to be transmitted. The strobe signal STB also does not have information indicating timing for data reading. In this respect, the strobe signal STB differs from the clock signal and the data signal. In general, the strobe signal STB is an element included in a protocol that deals with physical transmission means including a transmitter, a receiver, and a channel in the data transmission system.

Exemplary embodiments of the transmission signal will be described below assuming the transmitter 120 transmits a differential signal, to help understanding of embodiments. The transmission signal is not limited to a differential signal and it is to be understood that embodiments may also be applicable to a non-differential transmission signal.

Example FIGS. 2, 3 and 4 illustrate exemplary waveforms of a transmission signal generated from the transmitter 120 according to embodiments. Data $D_{n-1}$ is the last data of an $M_{th}$ data set (hereinafter, a data set is referred to as a packet) and data $D_0$ is the first data of an $(M+1)_{th}$ packet.

Referring to example FIGS. 2, 3 and 4, the transmitter 120 embeds a strobe signal STB before the data signal $D_0$ at the beginning of the $(M+1)_{th}$ packet, and embeds a clock signal CLK after the strobe signal STB, to generate the transmission signal. The strobe signal STB and a data signal $D_x$ have different magnitudes and the clock signal CLK and the data signal $D_x$ have the same magnitude. Here, x is 0 or a positive integer. Many embodiments can be realized according to the position of the clock signal CLK after the strobe signal STB.

In accordance with embodiments, the transmitter 120 may generate a transmission signal having the clock signal CLK immediately after the strobe signal STB and data signals D0, D1 and D2 following the clock signal CLK, as illustrated in example FIG. 2. In accordance with embodiments, the transmitter 120 may generate a transmission signal including the clock signal CLK spaced from the strobe signal STB by a predetermined distance. For example, as illustrated in example FIG. 3, the clock signal CLK can be embedded with being apart from the strobe signal STB by two data signals D0 and D1.

In accordance with embodiments, the transmitter 120 can embed a plurality of dummy signals between strobe signals STB. For instance, the transmitter 120 can embed a dummy signal (dummy signals) before and/or after the strobe signal STB. As illustrated in example FIG. 4, the transmitter 120 embeds dummy signals DC1 and DC2 before and after the strobe signal STB, respectively, to thereby generate a transmission signal. The dummy signal may be embedded for the following reason, as an example.

When data is transmitted at a high rate, the strobe signal STB may affect its neighboring signal. Therefore, if the dummy signals DC1 and DC2 are positioned before and after the strobe signal STB as illustrated in example FIG. 4, the influence of the strobe signal STB on its neighboring clock signal and data signals can be reduced in the case of example FIG. 2. The dummy insertion also helps with generation of the strobe signal STB. Further, when a plurality of dummy signals are embedded, the data reception apparatus 200 can recover the clock signal CLK conveniently and accurately.

While the transmitter 120 can set the magnitude of the strobe signal STB to be larger than that of the clock signal CLK or the data signal $D_x$ as illustrated in example FIGS. 2, 3 and 4, it may also set the magnitude of the strobe signal STB to be less than that of the clock signal CLK or the data signal $D_x$, unlike the examples illustrated in FIGS. 2, 3 and 4. For example, if the magnitude (SPH and SPL) of the strobe signal STB is set to be three times (HR and LR) larger than that of the data signal $D_x$ or the clock signal CLK, the data reception apparatus 200 may detect the strobe signal STB more easily.

Meanwhile, the data transmission apparatus 100 transmits differential components of the strobe signal STB as a differential signal to the data reception apparatus 200 through two lines of the channels 260. The differential components may have various values, as described below. In general, a differential signal has differential components. Among the differential components, a high component is defined as a 'positive level' and a low component is defined as a 'negative level'. The positive level is transmitted on one of the two lines used as a channel and the negative channel on the other line during transmission of the differential signal. Generally, when data to be transmitted is high in level, the one line carrying the positive level is called a P-channel and the other line carrying the negative level is called an N-channel. On the other hand, if data to be transmitted is low in level, the one line carrying the positive level is called an N-channel and the other line carrying the negative level is called a P-channel.

In accordance with embodiments, the strobe signal STB can be a symmetrical differential signal, as illustrated in example FIGS. 2 and 3. The symmetrical differential signal refers to a differential signal having differential components which are symmetrical to each other. That is, if the positive level SPH of the strobe signal STB is transmitted on the P-channel, its negative level SPL is transmitted on the N-channel. If the negative level SPL of the strobe signal STB is transmitted on the P-channel, its positive level SPH of the strobe signal STB is transmitted on the N-channel. As illustrated in example FIGS. 2 and 3, transmission of both positive and negative levels can reduce EMI.

In accordance with embodiments, the strobe signal STB can be an asymmetrical differential signal, as illustrated in example FIG. 4. The asymmetrical differential signal refers to a differential signal having asymmetrical differential components on the basis of common components. That is, if the positive level of the strobe signal STB transmitted is high, SPH, the negative level of the strobe signal transmitted can be equal to CDL or lower than a low level of the data signal Dx. If the negative level of the strobe signal STB transmitted is low, SPL, its positive level can be equal to CDH, or higher than a high level of the data signal Dx. In this manner, the strobe signal STB occupies a small proportion of the signaling time and thus the differential components of the strobe signal STB may have asymmetrical values.

According to embodiments, the data signal $D_x$ and the clock signal CLK may have the same pulse width. The pulse width of the strobe signal STB may have an integer multiple of the pulse width of the data signal $D_x$. In the illustrated case of example FIG. 2 or example FIG. 3, the strobe signal is equal to the data signal $D_x$ (or the clock signal CLK) in pulse width. However, the pulse width of the strobe signal STB is about twice that of the data signal $D_x$ in example FIG. 4. In embodiments, the pulse width of the strobe signal STB does not have information. Therefore, the pulse width of the strobe signal STB may be reduced as far as the strobe signal STB serves as a reference for recovering the clock signal CLK and the data signal, as part of a transmission protocol. That is, the rising time, falling time, rising inclination, and falling inclination of the strobe signal STB are not factors that affect transmission and reception operations.

As described above, the positive level of the strobe signal STB can be transmitted on the P-channel and its negative level on the N-channel, or vice versa. In general, when the P-channel carries the positive level and the N-channel carries the negative level, the polarity of the signal is defined as positive (+). On the contrary, when the P-channel carries the negative level and the N-channel carries the positive level, the polarity of the signal is defined as negative (−). These two polarities are mapped to binary numbers '0' and '1', respectively, as information. According to embodiments, the polarity of the strobe signal STB can be used as information. For example, the polarity of the strobe signal STB can be used as data information of a specific appointed data signal $D_x$ predetermined by the protocol. In the case where the data signal $D_x$ is the last signal $D_{n-1}$ of a packet, if the value of the signal $D_{n-1}$ is '1', the positive level of the strobe signal STB is transmitted on the P-channel, and if the value of the signal $D_{n-1}$ is '0', the positive level of the strobe signal is transmitted on the N-channel. This obviates the need for transmitting the last data $D_{n-1}$, thereby further increasing transmission efficiency. When data information about a data signal is delivered in the strobe signal STB in this manner, data can be transmitted in all bits of a transmission packet except for the clock signal and thus transmission efficiency can be increased. The transmission efficiency is calculated by dividing the number of bits having valid information except for bits required for carrying information, for example, bits for a clock signal or parity bits by the total number of transmission bits.

Now, a description will be made of the configuration and operation of the data reception apparatus 200. The strobe extractor 210 receives a transmission signal transmitted from the data transmission apparatus 100, extracts a strobe signal STB from the received transmission signal, and outputs the extracted strobe signal to the clock recoverer 220.

As stated before, because the strobe signal STB has a larger magnitude than the data signal $D_x$ or the clock signal CLK, it can be extracted by measuring the magnitude of the transmission signal, particularly by analyzing the difference between the differential components of the transmission signal. This will be described in more detail with reference to example FIGS. 8, 9 and 10, with a display as an exemplary application of the data transmission apparatus and the data reception apparatus.

The clock recoverer 220 recovers the clock signal CLK using the strobe signal STB extracted by the strobe extractor 210 and outputs the recovered clock signal RCLK to the sampler 230 and outside the data reception apparatus 200. The clock recoverer 220 extracts the clock signal CLK following the strobe signal STB using the extracted strobe signal STB, for example. Referring to example FIG. 2, the clock recoverer 220 determines the first crossing point 'a' after the strobe signal STB to be a rising edge of the recovered clock signal RCLK and determined the next crossing point 'b' to be a falling edge of the recovered clock signal RCLK. Referring to example FIG. 3, the clock recoverer 220 determines a crossing point 'c' corresponding to the start of the third signal being a clock or data signal after the strobe signal STB to be the rising edge of the recovered clock signal RCLK and determines the next crossing point 'd' to be the falling edge of the recovered clock signal RCLK. Referring to example FIG. 4, the clock recoverer 220 determines the first crossing point 'e' after the dummy signal DC2 following the strobe signal STB to be the rising edge of the recovered clock signal RCLK and determines the next crossing point 'f' to be the falling edge of the recovered clock signal RCLK.

After generating the recovered clock signal RCLK to be high between the rising edge 'a', 'c' or 'e' and the falling edge 'b', 'd' or 'f', the clock recoverer 220 keeps the recovered clock signal RCLK low until the next strobe signal STB is detected. When the next strobe signal STB is detected, the above-described operation is repeated, to thereby again detect the rising and falling edges of a recovered clock signal.

To obtain two crossing points with which a clock signal is recovered, the transmitter 120 can embed a clock signal CLK with a polarity opposite to that of the data signal $D_x$ following the clock signal CLK. That is, in example FIG. 2 or 4, the clock signal CLK has a polarity of the low level CDL but the following data signal $D_0$ has a polarity of the high level CLH. That is, rendering the clock signal CLK and the data signal $D_0$ to have opposite polarities may lead to generation of another edge, in addition to the first edge obtained at the crossing point between the strobe signal STB and the clock signal CLK. In example FIG. 3, the clock signal CLK has a polarity of the low level CDL, but the data signal $D_2$ following the clock signal CLK has a polarity of a high level CLH. That is, the clock signal CLK and the data signal $D_2$ may have opposite polarities, to which embodiments are not limited. As described later with reference to example FIG. 8, when the clock signal CLK is recovered using only one crossing point 'a', 'b', 'c', 'd', 'e', or 'f' using a Delay Locked Loop (DLL) or a Phase Locked Loop (PLL), there is no need for considering the polarities of the clock signal CLK and its following data signal.

The sampler 230 samples data signals included in the transmission signal in response to the recovered clock signal RCLK and outputs the sampled data through an output port OUT. That is, in example FIG. 2, the sampler 230 determines data information $D_0$, $D_1$ and $D_2$ about the data signals to be '1', '0', and '1', respectively by comparing two differential components of the transmission signal and outputs the determined data in response to the recovered clock signal RCLK. In the data reception apparatus 200 illustrated in example FIG. 1, the clock recoverer 220 receives the result of the comparison between the differential components of the transmission signal from the sampler 230 and recovers the clock signal CLK according to the comparison result, to which embodiments are not limited. Unlike the illustrated case of example FIG. 1, the transmission signal may be applied directly to the clock recoverer 220 without passing through the sampler 230. In this case, the clock recoverer 220 takes charge of the comparison operation of the sampler 230. The data reception apparatus 200 reads data using the recovered clock signal RCLK in an otherwise general manner, which will not be described herein.

As described before, the strobe signal STB may have different positive and negative levels on the basis of a common component. Yet, considering that the clock signal CLK is recovered and the data signal $D_x$ is read based on the difference between the differential components, the data reception apparatus 200 may be very insensitive to noise common to the pair of transmission lines during transmission on the channels 260. Even though the strobe signal STB changes in edges, it simply indicates a relative position of the clock signal CLK with respect to the strobe signal STB, not carrying time information, unlike the clock signal CLK. Therefore, the data reception apparatus 200 can detect the clock signal CLK accurately.

Meanwhile, when the polarity of the strobe signal STB is transmitted as data information about the appointed data signal $D_x$ predetermined according to a transmission protocol, the data reception apparatus 200 can perceive the polarity of the strobe signal STB as the level of the appointed data signal $D_x$. If the appointed data signal $D_x$ is the last data signal $D_{n-1}$ of a packet, the data reception apparatus 200 determines the value of the data signal $D_{n-1}$ to be '1' when the positive level of the strobe signal STB is transmitted on the P-channel, and to be '0' when the positive level of the strobe signal STB is transmitted on the N-channel.

The data transmission apparatus 100 and the data reception apparatus 200 illustrated in example FIG. 1 can be applied to various examples. An example of the configuration and operation where the data transmission apparatus 100 and the data reception apparatus 200 are applied to a display will be described below.

Example FIG. 5 illustrates the configuration of a display according to embodiments and example FIG. 6 illustrates only a transmission signal delivery structure between a timing controller 300 and column driving circuits 500 to help understanding of the display of example FIG. 5.

Referring to example FIGS. 5 and 6, the display includes the timing controller 300, a display panel 400, the column driving circuits 500, and row driving circuits 600. The column driving circuits 500 and the row driving circuits 600 can be integrated. The timing controller 300 controls the column driving circuits 500 and the row driving circuits 600. The column driving circuits 500 and the row driving circuits 600 drive the display panel 400. The display panel 400 displays an image according to scanning signals R1 to $R_n$ and data signals C1 to $C_m$. A display panel available between the timing controller 300 and a Display Driving Integrated circuit (DDI) can be used as the display panel 400, such as a Liquid Crystal Display (LCD) panel like Thin Film Transistor-LCD (TFT-LCD), Super Twisted Nematic-LCD (STN-LCD), or Ferroelectric LCD (FLCD), a Plasma Display Panel (PDP) panel, an Organic Luminescence Electro Display (OLED) panel, or a Field Emission Display (FED).

The row driving circuits 600 apply the scanning signals R1 to $R_n$ to the display panel 400 and the column driving circuits 500 apply the data signals C1 to $C_m$ to the display panel 400. The timing controller 300 receives data through an input port IN2, transmits a transmission signal including a data signal DATA, a strobe signal STB, and a clock signal CLK to the column driving circuits 500, and applies a clock signal CLK_R and a start pulse SP_R to the row driving circuits 600. While not shown, the timing controller 300 may output a control signal for controlling the column driving circuits 500, such as a start pulse SP, indicating the start of data delivery for a new horizontal scanning line, in a unit packet according to a transmission protocol. The data signal DATA that the timing controller 300 provides to the column driving circuits 500 may include only image data to be displayed on the display panel 400 or both the image data and a control signal.

The timing controller 300 corresponds to the data transmission apparatus 100 illustrated in example FIG. 1. The timing controller 300 generates a transmission signal in which a strobe signal STB is embedded between data signals DATA inputted through input port IN2. A clock signal CLK is embedded to follow the strobe signal STB. The strobe signal STB is different from a data signal DATA in magnitude and the clock signal CLK is equal to the data signal DATA in magnitude. The timing controller 300 then transmits the transmission signal to the column driving circuits 500. As described before, the transmission signal can be a differential signal. In this case, only one differential pair is used to deliver the strobe signal STB, the clock signal CLK, and the data signal DATA from the timing controller 300 to one column driving circuit 500. More specifically, the timing controller 300 can transmit the clock signal CLK immediately embedded after the strobe signal STB as illustrated in example FIG. 2. The clock signal CLK may be spaced from the strobe signal STB by a predetermined distance as illustrated in example FIG. 3, or the dummy signals DC1 and DC2 before and/or after the strobe signal STB as illustrated in example FIG. 4. The timing controller 300 may set the magnitude of the strobe signal STB larger than that of the clock signal CLK as illustrated in example FIGS. 2, 3 and 4, or less than that of the clock signal CLK unlike example FIGS. 2, 3 and 4. Also, the timing controller 300 may transmit one or more dummy signals DC1 and DC2, transmit a plurality of clock signals CLK embedded between strobe signals STB, transmit a clock signal CLK having an opposite polarity to that of its following data signal DATA, or transmit a strobe signal STB having a pulse width that is a multiple integer of a minimum pulse width of a data signal DATA. The timing controller 300 may also transmit a control signal, for example, a start pulse (SP) following the strobe signal STB in a unit packet according to a transmission protocol.

Meanwhile, each column driving circuit 500 corresponds to the data reception apparatus 200 illustrated in example FIG. 1. The column driving circuit 500 receives the transmission signal transmitted from the timing controller 300, extracts the strobe signal STB from the transmission signal, recovers the clock signal CLK using the extracted strobe signal STB, and samples the data signals DATA included in the transmission signal using the recovered clock signal. Configurations and operations of each of the timing controller 300 and column driving circuit 500 illustrated in example FIGS. 5 and 6 according to embodiments will be described below.

Example FIG. 7 is a schematic block diagram of the timing controller 300 illustrated in example FIGS. 5 and 6 according to embodiments. The timing controller 300 is labeled by reference numeral 300A in example FIG. 7. Referring to example FIG. 7, the timing controller 300A includes a receiver 310, a buffer 320, a transmitter 330, a clock generator 340, a controller 350, and a data generator 360. The transmitter 330 and the clock generator 340 illustrated in example FIG. 7 are identical to the transmitter 120 and the clock generator 110 illustrated in example FIG. 1, respectively, in configuration and function. The data transmission apparatus 100 illustrated in example FIG. 1 may further include the receiver 310 and the buffer 320 illustrated in example FIG. 7. When this data transmission apparatus 100 is applied to the timing controller 300A of the display, the timing controller 300A includes the controller 350 and the data generator 360 in addition to the data transmission apparatus 100.

In the timing controller 300A, the receiver 310 receives image data LVDS DATA and an external clock signal LVDS CLK' through the input port IN2, converts the image data LVDS DATA to a Transistor-Transistor Logic (TTL) signal, and outputs the TTL signal to the data generator 360. The receiver 310 also coverts the external clock signal LVDS CLK' to a TTL signal and outputs the TTL signal to the clock generator 340. The input signal of the receiver 310 can be an LVDS differential signal, to which embodiments are not limited. Hence, the input signal of the receiver 310 can be a Transition Minimized Differential Signal (TMDS) or any signal having pattern other than a differential signal. A TTL signal generally refers to a digital signal that has as large a voltage width as a power voltage, unlike an LVDS signal having a small voltage width of 0.35V.

The controller 350 receives an external information signal and generates a control signal corresponding to the external information signal. Here, the controller 350-generates a control signal for controlling the column driving circuits 500 using the information signal according to a predetermined transmission protocol. The information signal is a TTL signal, for example carrying display control information such as the resolution of an image to be displayed on the display panel 400. The controller 350 also controls each component illustrated in example FIG. 7.

The data generator 360 processes the image data DATA received from the receiver 310 according to the control signal received from the controller 350 and outputs the processed image data to the buffer 320. If the control signal is generated based on an information signal having resolution information in the controller 350, the data generator 360 processes the image data DATA such that the image can be displayed on the display panel 400 at an intended resolution. Also, the data generator 360 may output the control signal along with the image data to the buffer 320.

The buffer 320 receives and buffers the image data output from the data generator 360, and outputs the buffered image data as a data signal DATA to the transmitter 330. The buffer 320 may also output the control signal received from the data generator 360 to the transmitter 330.

The clock generator 340 generates a start pulse SP_R and the clock signal CLK_R to be transmitted to a row driving circuit 600, and a clock signal CLK to be transmitted to a column driving circuit 500, from the TTL clock signal CLK' received from the receiver 310. The reason for generating the clock signal CLK from the external clock signal CLK' in the clock generator 340 is that the frequency of the clock signal CLK for use in the display illustrated in example FIG. 5 may differ from that of the external clock signal LVDS CLK'.

The transmitter 330 generates a transmission signal by embedding a strobe signal STB between the data signal received from the buffer 320 and the clock signal CLK received from the clock generator 340 and outputs the transmission signal CD1, CD2, ..., or $CD_m$ to a corresponding column driving circuit 500. That is, the transmitter 330 transmits a strobe signal STB, a clock signal CLK, and a data signal DATA on one differential pair for each column driving circuit 500. As described before, a strobe signal STB having a different magnitude from that of the clock signal CLK is embedded and transmitted. In this case, the clock signal CLK and the data signal DATA have the same magnitude.

According to embodiments, the transmitter 330 may further include the control signal received from the controller 350 via the buffer 320 and the data generator 360 as well as the image data, in the data signal DATA. In this case, the transmitter 330 may include the clock signal CLK and the control signal after the strobe signal STB in the transmission signal.

The configuration and operation of the transmitter 330 according to embodiments will be described below. The transmitter 330 can be configured so as to include a demultiplexer 332, a plurality of serializers 334, and a plurality of drivers 336. The demultiplexer 332 demultiplexes data signals received from the buffer 320 according to the respective serializers 334 in response to clock signals CLK.

Each of the serializers 334 serializes a strobe signal STB, a clock signal CLK, and a data signal DATA sequentially and outputs the resulting serial signal to a driver 336. For example, when the transmission signal has the form illustrated in example FIG. 2, the serializer 334 sequentially outputs the data $D_{n-2}$ and $D_{n-1}$ of the Mth packet, the strobe signal STB, the clock signal CLK, and then data $D_0$, $D_1$ and $D_2$ of the $(M+1)_{th}$ packet in this order.

The driver 336 receives the signal output from the serializer 334, changes the magnitude of the strobe signal STB, which is positioned between the last data of the Mth packet and the clock signal CLK for the $(M+1)_{th}$ packet (or positioned at a predetermined position), to be different from that of the data signal DATA, and outputs the resulting transmission signal. Herein, the driver 336 sets the magnitudes of the data signal DATA and the clock signal CLK to be equal to generate the transmission signal. Also, the driver 336 converts the serial signal received from the serializer 334 to a differential signal.

In accordance with embodiments, the driver 336 may convert the serial signal received from the serializer 334 to a symmetrical differential signal as illustrated in example FIGS. 2 and 3. In accordance with embodiments, the driver 336 may convert the data signal DATA and the clock signal CLK in the serial signal received from the serializer 334 to symmetrical differential signals and the strobe signal STB in the serial signal to an asymmetrical differential signal.

Meanwhile, the polarity of the strobe signal STB can be used as data information about the appointed data signal $D_x$ predetermined according to a transmission protocol. If the appointed data signal $D_x$ is the last data signal $D_{n-1}$ of a packet, the driver 336 determines the positive and negative levels of the strobe signal STB to be transmitted through channels according to the level of the last data signal $D_{n-1}$. That is, if the level of the last data signal $D_{n-1}$ is '1', the positive level of the strobe signal STB is transmitted on the P-channel and its negative level is transmitted on the N-channel. If the level of the last data signal $D_{n-1}$ is '0', the positive level of the strobe signal STB is transmitted on the N-channel and its negative level is transmitted on the P-channel.

Herein, a description will be made of the configuration and operation of a column driving circuit 500 illustrated in example FIG. 5 according to embodiments. Example FIG. 8 is a block diagram of a column driving circuit 500 illustrated in example FIGS. 5 and 6 according to embodiments. The column driving circuit 500 is labeled by reference numeral 500A in example FIG. 8. The column driving circuit 500A includes an input buffer 510, a strobe extractor 520, a clock recoverer 530, a sampler 540, and a driving data processor 580.

The strobe extractor 520, the clock recoverer 530, and the sampler 540 illustrated in example FIG. 8 are identical in configuration and operation to the strobe extractor 210, the clock recoverer 220, and the sampler 230 illustrated in example FIG. 1, respectively. Thus, it is clear that the later-described configurations and operations of the components 520, 530 and 540 are applicable to the components 210, 220 and 230.

The channels 260 connected to the timing controller 300 corresponding to the data transmission apparatus 100 and the column driving circuit 500A corresponding to the data reception apparatus 200 may cause various interfacing problems such as impedance mismatch. To avert these problems, the input buffer 510 interfaces the channels 260 with the column driving circuit 500A. That is, the input buffer 510 buffers a transmission signal received through an input port IN3 and outputs the buffered transmission signal to the strobe extractor 520 and the sampler 540.

The strobe extractor 520 extracts a strobe signal from the transmission signal received from the input buffer 510. For the extraction of the strobe signal, the configuration and operation of the strobe extractor 520, in accordance with embodiments, are described below.

Example FIG. 9 illustrates a waveform to describe a hysteresis comparator illustrated in example FIG. 8. In example FIG. 9, the horizontal axis represents a differential component $V_d$ of a transmission signal input to the hysteresis comparator 522. The vertical axis represents an output voltage $V_o$ of the hysteresis comparator 522.

In accordance with embodiments, the strobe extractor 520 can be configured as the hysteresis comparator 522. The hysteresis comparator 522 compares the differential component $V_d$ of the transmission signal with a threshold voltage $V_{th}$ and outputs a strobe signal STB according to the result of the comparison. That is, if the differential component $V_d$ of the transmission signal changes to be higher than a positive threshold voltage $V_{th}$ or lower than a negative threshold voltage $-V_{th}$, the hysteresis comparator 522 converts the output voltage $V_o$ to one of a ground voltage and a positive voltage VDD, for the strobe signal STB, in response to the differential component $V_d$. Otherwise, the hysteresis comparator 522 maintains the same output voltage $V_o$. For this purpose, the driver 336 should transmit the positive and negative levels of the strobe signal STB alternately on the P-channel and the N-channel because, as illustrated in example FIG. 9, when the differential component $V_d$ of the transmission signal is higher than the threshold voltage $V_{th}$, a strobe signal STB for the $M_{th}$ packet is generated as the positive voltage VDD from the hysteresis comparator 522 and then only when the differential component $V_d$ of the transmission signal is lower than the threshold voltage $-V_{th}$, the strobe signal STB for the $(M+1)_{th}$ packet can change to the ground voltage. The threshold voltage $V_{th}$ can follow the scheme in example FIGS. 2, 3 and 4. In this manner, the strobe signal STB may be extracted by comparing the differential component $V_d$ of the transmission signal with the threshold voltage $V_{th}$. Thus, even though there is a change in the level of a common component being the mean level of the differential components of the clock and data signals CLK and DATA received at the column driving circuit 500A, the column driving circuit 500A can detect the strobe signal STB accurately.

Example FIGS. 10A and 10B are a block diagram and an operational waveform diagram of the strobe extractor 520 illustrated in example FIG. 8 according to embodiments. Referring to example FIG. 10A, the strobe extractor includes first and second level comparators 524 and 525, first and second combiners 526 and 527, and a first OR gate 528. VDD denotes an operation voltage for the comparators 524 and 525.

In accordance with embodiments, the first combiner 526 combines an N-channel component among differential inputs of the transmission signal with a first offset level and outputs the combined level to a negative (−) input port of the first level comparator 524. The second combiner 527 combines a P-channel component among the differential inputs of the transmission signal with a second offset level—and outputs the combined level to a negative (−) input port of the second level comparator 525. The first level comparator 524 compares the P-channel component of the received transmission signal with the combined level received from the first combiner 526, and outputs the comparison result to the OR gate 528. The second level comparator 525 compares the N-channel component of the received transmission signal with the combined level received from the second combiner 527, and outputs the comparison result to the OR gate 528. The OR gate 528 OR-operates (i.e. performs an OR operation on) the comparison results received from the first and second level comparators 524 and 525 and outputs the OR-operation result as a strobe signal STB.

The first offset level should be larger than a differential component of the data signal, if the differential component of the data signal (i.e. the difference obtained by subtracting an N-channel component from a P-channel component in the data signal) is positive (+). For instance, the first offset level can be (HR-LR) in example FIGS. 2, 3 and 4. The second offset level should be less than the differential component of the data signal, if the differential component of the data signal is negative (−). For instance, the second offset level can be (LR-HR) in example FIGS. 2, 3 and 4. The absolute values of the first and second offset levels can be the same or different.

Referring to example FIG. 10B, the strobe extractor illustrated in example FIG. 10A outputs a strobe signal STB at a high level VDD, if the differential component of the transmission signal is larger than the first offset level, for example, (HR-LR), or outputs a strobe signal STB at a high level VDD if the differential component of the transmission signal is less than the negative second offset level, for example, (LR-HR).

Meanwhile, the sampler 540 illustrated in example FIG. 8 samples data signals in response to the clock signal RCLK in the transmission signal received from the input buffer 510. In accordance with embodiments, the sampler 540 can be configured so as to include a third level comparator 542 and a first D flipflop 544.

The third level comparator 542 compares differential components of the transmission signal received from the input buffer 510 with each other and provides the comparison result to a data input port D of the first D flipflop 544. For example, referring to example FIG. 2, the third level comparator 542 compares two differential components of the data signal $D_0$ and outputs a logic 'high' level of '1', compares two differential components of the data signal $D_1$ and outputs a logic 'low' level of '0', and compares two differential components of the data signal $D_2$ and outputs a logic 'high' level of '1'.

The first D flipflop 544 receives the comparison result through the data input port D from the third level comparator 542 and outputs the comparison result through a positive output port Q in response to the clock signal RCLK received through a clock port. The sampler 540 can also, for example, convert the sampled data to parallel data.

The configuration and operation of the clock recoverer 530 illustrated in example FIG. 8 will be described below. In accordance with embodiments, the clock recoverer 530 may include a clock detector 532 and a PLL (or DLL) 534. The clock detector 532 detects at least one of the leading edge and trailing edge of the clock signal CLK following the strobe signal STB according to a signal (CLK+DATA) received from the third level comparator 542.

Example FIG. 11 is a block diagram of the clock detector 532 illustrated in example FIG. 8 according to embodiments. The clock detector 532 includes second and third D flipflops 550 and 522, an inverter 551, and a second OR gate 554. Example FIG. 12 illustrates waveforms of input and output signals in each component illustrated in example FIG. 11. In example FIG. 12, an edge indicated by an arrow represents clock information.

The second D flipflop 550 illustrated in example FIG. 11 receives the positive voltage VDD through a data input port D, the signal (CLK+DATA) through a clock port CK from the third level comparator 542, and the strobe signal STB through a clear port CL. Hence, the second D flipflop 550 outputs the positive voltage VDD in response to the comparison result from the third level comparator 542 of the sampler 540 and is cleared in response to the strobe signal STB.

The inverter 551 inverts the comparison result of the third level comparator 542 of the sampler 540 and outputs the inverted value to a clock port CK of the third D flipflop 552.

The third D flipflop 552 receives the positive voltage VDD through an input port D, the inverted value of the signal (CLK+DATA) output from the third level comparator 542 through a clock port CK, and the strobe signal STB through a clear port CL. Hence, the third D flipflop 552 outputs the positive voltage VDD in response to the inverted value received from the inverter 551 and is cleared in response to the strobe signal STB.

The second OR gate 554 OR-operates the signals received from the positive output ports Q of the second and third D flipflops 550 and 552 and outputs the OR-operation value as the clock signal CLK" detected by the clock detector 532.

In example FIG. 11, the second flipflop 550 is intended for detecting the first rising edge after the strobe signal STB in the signal (CLK+DATA) received from the third comparator 542 and the third flipflop 552 and the inverter 551 are intended for detecting the first falling edge after the strobe signal STB in the signal (CLK+DATA) received from the third comparator 542.

Only the first edge after the strobe signal STB is detected and used as clock information in embodiments illustrated in example FIG. 11. Therefore, there is no need for taking into account the polarity of the data signal $D_x$ following the clock signal.

The clock signal is different from the data signal in that it has time information at its rising edge or falling edge. While phase may convey information about data in the case of phase modulation, the data signal generally has information at a logic low level or a logic high level. This implies that once one of the rising and falling edges of a clock signal in every packet is detected, an entire clock signal for sampling all data signals $D_x$ of each packet can be recovered using the PLL (or DLL) 534. The PLL (or DLL) 534 generates a plurality of edges with delayed phases at every predetermined interval between clock signals detected from each packet, combines the edges, and outputs the combined values the as the recovered clock signal RCLK.

In example FIG. 8, the PLL (or DLL) 534 also generates the clock signal RCLK using the edges of the clock signal CLK" detected by the clock detector 532. In example FIGS. 2, 3 and 4, the clock signal can be recovered as illustrated in example FIG. 8 by setting the start of a clock signal using only one of the rising edge ('a', 'c' or 'e') and falling edge ('b', 'd' or 'f') of the clock signal CLK" detected by the clock detector 532 and generating a clock signal having an arbitrary width on the basis of the start. In this case, the trailing edge of the arbitrarily generated clock signal CLK" is not used for the clock recovery. The PLL (or DLL) 534 may not be used even though the clock detector 532 detects the leading or trailing edge of the clock signal. In this case, the detected clock signal CLK is delayed every predetermined time and the delayed time of the clock signal is used as a sampling time for data. However, if the period of the clock signal CLK embedded in the transmission signal is one packet long and the packet length is 10 times larger than the width of each data, the column driving circuit 500A may generate the clock signal RCLK having a period equal to the width of data using the PLL (or DLL) 534.

In the mean time, the driving data processor 580 receives the sampled data from the sampler 540, converts the received data to a display panel driving signal suitable for driving the display panel 400, and outputs the display panel driving signal $Y1, Y2, \ldots, Y_k$ to the display panel 400. The analog signal $Y1, Y2, \ldots, Y_k$ is one of the signals C1 to Cm illustrated in example FIG. 5. For example, if the sampled data is not arranged in time, the driving data processor 580 arranges the sampled data by matching data value changing times. In addition, the driving data processor 580 sequentially stores data included in the arranged data signal in response to sequential shifts of the start pulse SP and then outputs the stored data in parallel. The parallel signals are converted to the analog signal $Y1, Y2, \ldots, Y_k$. The driving data processor 580 can autonomously generate the start pulse SP in response to a clock signal from a packet received according to a transmission protocol.

Example FIG. 13 is a block diagram of a display according to embodiments and example FIG. 14 illustrates a transmission signal delivery structure between a timing controller 302 and column driving circuits 502 to help understanding of the display illustrated in example FIG. 13.

The display illustrated in example FIGS. 5 and 6 uses a point-to-point scheme, whereas the display illustrated in example FIGS. 13 and 14 adopts a point-to-couple scheme. Apart from the used schemes, the displays illustrated in example FIGS. 5, 6, 13, and 14 are identical in configuration and operation and their matching components and operations will not be described herein. That is, the timing controller 302, a display panel 402, the column driving circuits 502, and row driving circuits 602 are the same in configuration and operation as the timing controller 300, the display panel 400, the column driving circuits 500, and the row driving circuits 600 illustrated in example FIG. 5.

In the display illustrated in example FIGS. 5 and 6, one differential pair is connected to each column driving circuit 500, while one differential pair is connected to two column driving circuits 502 in the display illustrated in example FIGS. 13 and 14. Therefore, the latter transmits double the amount of data through the differential pair, compared to the former. That is, when a display is configured as illustrated in example FIGS. 5 and 6, the demultiplexer 332 illustrated in example FIG. 7 outputs a data signal for one column driving circuit 500 to one serializer 334. On the other hand, if a display is configured as illustrated in example FIGS. 13 and 14, the demultiplexer 332 outputs data signal corresponding to a plurality of column driving circuits 502 to one serializer 334.

When a timing skew error is generated, accurate clock recovery is impossible. As a consequence, an inaccurate position is indicated for a data signal in proportion to the magnitude of the time skew error. According to embodiments, however, the timing skew error of a clock signal during clock recovery, for example, a change in the time interval between clock signals and/or the time interval between a clock signal and a data signal, is very small. The timing controller 300 or 302 transmits a data signal and a clock signal to the column driving circuits 500 or 502 in the display, so that the clock signal can be recovered very securely. Therefore, a 1.5-Gbps/ch performance or higher may be achieved.

Before the data transmission apparatus 100, 300 or 302 transmits data, the data reception apparatus 200, 500 or 502 can spare a predetermined time period for clock recovery. During the predetermined time period, the data transmission apparatus 100, 300 or 302 does not transmit valid data.

While the data transmission apparatus 100 and the data reception apparatus 200 illustrated in example FIG. 1 have been described for a display, they are also applicable to voice signal processing. In this case, the receiver 310 of the data transmission apparatus 100 receives voice data and the buffer 320 buffers the voice data and outputs the buffered voice data as a data signal to the transmitter 330. The data reception apparatus 200 operates in the same manner as for image data processing as described above.

In the illustrated case of example FIG. 5, the timing controller 300 transmits only one pair of signals to each column driving circuit 500, to which embodiments are not limited. Herein, one pair of signals refer to a pair of a P-channel and an N-channel. That is, to transmit more data between the timing controller 300 and each column driving circuit 500, a plurality of pairs of signals can be transmitted from the timing controller 300 to each column driving circuit 500.

Similarly, while the timing controller 302 transmits only one pair of signals to two column driving circuits 502 in example FIG. 13, to which embodiments are not limited, a plurality of pairs of signals can be transmitted from the timing controller 302 to the two column driving circuits 502, in order to transmit more data.

Since the data transmission apparatus of embodiments transmits a clock signal and a data signal with the same magnitude in the same path, the clock signal and the data signal can be processed in the same manner during transmission and recovery. Therefore, the probability of generating a timing skew error in the time interval between the clock signal and the data signal is minimized. Even though the level of a common component changes, the clock signal can be recovered accurately and the size of a clock recovery circuit can be reduced. Further, embodiments are suitable for transmitting/receiving data at a high frequency, that is, at a high transmission rate. Embodiments are robust against noise generated during transmission of the data signal and the clock signal or against noise generated in a common path. Since a strobe signal can carry data in a data signal, data transmission efficiency can be increased.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
    a strobe extractor configured to receive a transmission signal and extract a strobe signal from the transmission signal, the transmission signal including the strobe signal inserted between data signals and a clock signal following the strobe signal, the strobe signal having a different magnitude from a magnitude of a data signal, and the clock signal having a magnitude equal to the magnitude of the data signal;
    a clock, recoverer configured to recover the clock signal from the transmission signal, using the extracted strobe signal; and
    a sampler configured to sample the data signals included in the transmission signal in response to the recovered clock signal,
    wherein the strobe extractor compares a differential component with a threshold voltage and outputs the strobe signal according to a result of the comparison of the strobe extractor.

2. The apparatus of claim 1, wherein the clock recoverer includes a clock detector configured to extract at least one of a leading edge and a trailing edge of the clock signal following the strobe signal.

3. The apparatus of claim 2, wherein the clock recoverer further includes a delay locked loop configured to generate the recovered clock signal using the detected edge.

4. The apparatus of claim 2, wherein the clock recoverer further includes a phase locked loop configured to generate the recovered, clock signal using the detected edge.

5. The apparatus of claim 1, wherein the sampler includes:
    a first level comparator configured to compare differential components of the transmission signal and output a result of the comparison; and
    a first D flipflop configured to output the comparison result received from the first level comparator in response to the recovered clock signal,
    wherein the clock recoverer recovers the clock signal, in response to the comparison result.

6. The apparatus of claim 1, wherein the polarity of the strobe signal is translated as a polarity of appointed data according to a transmission protocol.

7. An apparatus comprising:
    a strobe extractor configured to receive a transmission signal and extract a strobe signal from the transmission signal, the transmission signal including the strobe signal inserted between data signals and a clock signal following the strobe signal, the strobe signal having a different magnitude from a magnitude of a data signal, and the clock signal having an equal magnitude to the magnitude of the data signal;
    a clock recoverer configured to recover the clock signal from the transmission signal, using the extracted strobe signal; and
    a sampler configured to sample the data signals included in the transmission signal in response to the recovered clock signal,
    wherein the strobe extractor compares a differential component with first and second offsets levels and outputs the strobe signal according to a result of the comparison of the strobe extractor.

8. The apparatus of claim 7, wherein the strobe extractor includes:
    a first combiner configured to combine an N-channel component in the differential components of the transmission signal with the first offset level, and outputting the combined level;
    a second combiner configured to combine a P-channel component in the differential components of the transmission signal with the second offset level, and outputting the combined level;

a first level comparator configured to compare the P-channel component of the transmission signal with the combined level received from the first combiner, and output a result of the comparison;

a second level comparator configured to compare the N-channel component, of the transmission signal with the combined level received from the second combiner, and output a result of the comparison; and a first OR gate configured to perform an OR operation on the comparison results received from the first and second level comparators, and outputting a result of the OR operation as the extracted strobe signal.

9. The apparatus of claim 8, wherein if a differential component of a data signal is positive, the first offset level is larger than the differential component of the data signal.

10. The data reception apparatus according to claim 8, wherein if a differential component of a data signal is negative, the second offset level is less than the differential component of the data signal.

11. The apparatus of claim 8, wherein absolute values of the first and second offset levels are equal.

12. An apparatus comprising:
a strobe extractor configured to receive a transmission signal and extract a strobe signal from the transmission signal, the transmission signal including the strobe signal inserted between data signals and a clock signal following the strobe signal, the strobe signal having a positive level and a negative level transmitted on an alternating P-channel and N-channel and having a different magnitude from a magnitude of a data signal, and the clock signal having an equal magnitude to the magnitude of the data signal;

a clock recoverer configured to recover the clock signal from the transmission signal, using the extracted strobe signal; and a sampler configured to sample the data signals included in the transmission signal in response to the recovered clock signal, wherein the strobe extractor compares a differential component with a threshold voltage and outputs the strobe signal according to a result of the comparison of the strobe extractor.

13. The apparatus of claim 12, wherein the sampler includes:
a third level comparator configured to compare the differential components of the transmission signal, and output a result of the comparison; and a first D flipflop configured to output the comparison result received from the third level comparator in response to the recovered clock signal.

14. The apparatus of claim 13, wherein the clock recoverer includes a clock detector configured to extract at least one of a leading edge and a trailing edge of the clock signal following the strobe signal.

15. The apparatus of claim 14, wherein the clock recoverer further includes a delay locked loop configured to generate the recovered clock signal using the edge extracted by the clock recoverer.

16. The apparatus of claim 14, wherein the clock, recoverer further includes a phase locked loop configured to generate the recovered clock signal using the edge extracted recoverer.

17. The apparatus of claim 14, wherein the clock detector includes:
a second D flipflop configured to output a positive voltage in response to the comparison result received from the third level comparator and to be cleared in response to the strobe signal.

18. The apparatus of claim 17, wherein the clock detector includes:
an inverter configured to invert the comparison result received from the third level comparator, and output the inverted value.

19. The apparatus of claim 18, wherein the clock detector includes:
a third D flipflop configured to output the positive voltage in response to the inverted value and to be cleared in response to the strobe signal.

20. The apparatus of claim 19, wherein the clock detector includes:
a second OR gate configured to perform an OR operation on signals received from the second and third D flipflops, and output a result of the OR operation as the detected clock signal.

* * * * *